United States Patent [19]

Shibata

[11] Patent Number: 5,442,755
[45] Date of Patent: Aug. 15, 1995

[54] MULTI-PROCESSOR SYSTEM WITH LOCK ADDRESS REGISTER IN EACH PROCESSOR FOR STORING LOCK ADDRESS SENT TO BUS BY ANOTHER PROCESSOR

[75] Inventor: Masabumi Shibata, Kawasaki, Japan

[73] Assignee: Hitachi, Ltd., Tokyo, Japan

[21] Appl. No.: 144,486

[22] Filed: Oct. 29, 1993

Related U.S. Application Data

[63] Continuation of Ser. No. 630,860, Dec. 20, 1990, abandoned.

[30] Foreign Application Priority Data

Dec. 25, 1989 [JP]  Japan .................. 1-335941

[51] Int. Cl.⁶ ............................................. G06F 13/16
[52] U.S. Cl. ...................... 395/325; 395/425; 395/725
[58] Field of Search .............. 395/425, 325, 725, 275; 364/246.8, DIG. 1, 969.2, DIG. 2

[56] References Cited

U.S. PATENT DOCUMENTS

| | | | |
|---|---|---|---|
| 4,224,664 | 9/1980 | Trinchieri | 395/575 |
| 4,402,046 | 8/1983 | Cox et al. | 395/200 |
| 4,574,350 | 3/1986 | Starr | 395/725 |
| 4,733,352 | 3/1988 | Nakamura et al. | 395/425 |
| 4,937,733 | 6/1990 | Gillett, Jr. et al. | 395/325 |
| 4,975,870 | 12/1990 | Knicely et al. | 395/425 |
| 4,984,153 | 1/1991 | Kregness et al. | 395/425 |
| 5,341,491 | 8/1994 | Ramanujan | 395/425 |

FOREIGN PATENT DOCUMENTS 63-259758  10/1988  Japan ................ G06F 15/16

Primary Examiner—Jack B. Harvey
Assistant Examiner—Glenn A. Auve
Attorney, Agent, or Firm—Antonelli, Terry, Stout & Kraus

[57] ABSTRACT

A multi-processor system wherein a plurality of processors connected to a common bus share a main storage by means of a storage controller connected to the common bus. If a processor executes a lock setting, the other processors receive the lock address sent to the common bus by the processor. When another processor issues a request regarding the main storage, the request address is compared with the received lock address. If the request address is the same as the lock address, the processor suspends issuing the request regarding the main storage.

8 Claims, 5 Drawing Sheets

| ITEM | REQUEST COMMANDS |
|------|------------------|
| 1 | 8B FETCH |
| 2 | 32B FETCH |
| 3 | 8B STORE |
| 4 | 16B STORE |
| 5 | 8B FETCH AND LOCK SETTING |
| 6 | 8B STORE AND LOCK RELEASE |

MULTI-PROCESSOR SYSTEM WITH LOCK ADDRESS REGISTER IN EACH PROCESSOR FOR STORING LOCK ADDRESS SENT TO BUS BY ANOTHER PROCESSOR

This application is a continuation of application Ser. No. 630,860 filed on Dec. 20, 1990, now abandoned.

BACKGROUND OF THE INVENTION

The present invention relates to a multi-processor system capable of executing a lock operation at high speed.

In order for a plurality of processors of a multi-processor system to share data of a main storage (hereinafter represented by MS), it is necessary to provide a lock function to allow one processor to read/write data by inhibiting another processor from accessing the data for a predetermined time period. A technique regarding such a lock function is described, for example, in Japanese Laid-open Publication JP-A-63-259758.

This conventional technique will be described below.

Each individual processor (hereinafter represented by IP) is provided with a buffer storage (hereinafter represented by BS) under store through control and a buffer address array (hereinafter represented by BAA) for storing a directory of the BS. A storage controller (hereinafter represented by SC) is provided with a front address array (hereinafter represented by FAA) for storing a copy of a part of the BAA.

Each entry of the BAA has a reserve bit (hereinafter represented by RSV bit) and a lock bit (hereinafter represented by L bit), and the FAA has a copy of the RSV bits of the BAA.

A lock requesting IP refers to an entry of the BAA corresponding to a lock address. If the RSV bit is "1", the lock requesting IP immediately sets "1" in the L bit to thereafter enter a lock state.

If the RSV bit is not "1", the lock requesting IP sends the lock address to the SC. The SC refers to all RSV bits of the FAA at the corresponding entry. If there is an FAA entry having an RSV bit "1", then the SC issues a cancel request to the IP corresponding to the FAA entry having an RSV bit "1". After the cancel operation is completed, or if there is no FAA entry having an RSV bit "1", the RSV bit in the FAA entry of the lock requesting IP is set to "1". The SC notifies the lock requesting IP of a lock acceptance. The lock requesting IP then sets "1" in the corresponding RSV bit and L bit to thereafter enter a lock state.

Releasing the lock state is realized by setting "0" in the L bit of the BAA.

If one IP is entering a lock state, the RSV bit of a BAA entry of another IP which intends to access the lock address is necessarily "0". Therefore, a request is issued to the SC which in turn issues a cancel request to the locking IP having the RSV bit "1" at the corresponding FAA entry. The locking IP will not respond to this cancel request until it releases the lock state. Therefore, an access to the lock address by the other lock requesting IP will be delayed until the lock state is released.

The conventional technique has realized the lock function by the operation described above.

According to the above-described conventional technique, a copy of a part of the MS is exclusively stored in the BS of each IP. While one IP locks and accesses a block of the MS, an access to the block by another IP is inhibited and delayed until the lock state is released.

The IP sends a request and a request address to the SC for storage of a copy of a block of the MS, whereas the SC returns a lock acceptance to the IP for permission to store the block. Therefore, it is necessary to provide signal lines for the request, the request address, and the lock acceptance, between the SC and each IP.

As the number of the IPs in a multi-processor system increases, the number of signal lines increases proportionally. The number of signal lines is limited, however, by restrictions such as the number of pins of an LSI and the like.

In view of the above problem, in the conventional technique, the control signal lines for the request, the lock acceptance, and the like are provided independently for each IP, whereas a number of address signal lines are made of a bus commonly used by all the IPs.

With the bus for the signal lines of the request address, it is not possible for a plurality of IPs to send request addresses at the same time. It becomes necessary therefore to provide means for arbitrating a bus privilege between IPs.

For the arbitration of a bus privilege, a bus acceptance signal is used for giving a bus privilege to a lock requesting IP from the SC. Addition of the bus acceptance signal makes the control logic somewhat complicated increases the time required for the IP to issue a request. This disadvantage is inherent to a bus and can be permissible. Apart from the above, two functions must be additionally provided. Namely, with the first function, if the SC cannot send back an acceptance immediately after the IP responds to a bus acceptance signal and sends a request address because another IP is locking the block, the lock requesting IP is requested to immediately release the bus privilege, and the SC is allowed to receive another lock request from another IP. With the second function, the SC is allowed to receive a request from the IP while holding the request address sent by another IP. However, if the first function is provided to immediately release a bus privilege and receive another request from another IP if an immediate response of a lock acceptance is not possible, the control logic of the SC becomes very complicated.

SUMMARY OF THE INVENTION

It is an object of the present invention to provide a multi-processor system capable of executing a lock operation with respect to a particular address, without making the control logic of the SC complicated.

Each IP of a multi-processor system of this invention stores as a lock address a request address sent by another IP for setting a lock of the MS until the other IP releases the lock of the MS. Each IP compares a request address intended to be issued to the MS with a lock area of the MS defined by the stored lock address. If the comparison result indicates that the request address belongs to the lock area, the IP suspends sending the request to the MS.

According to the present invention, it is possible to provide a multi-processor system wherein each IP can independently execute a lock operation of a particular address of the MS at high speed without making the control logic of the SC complicated.

DESCRIPTION OF THE PREFERRED EMBODIMENTS

Figure 1:
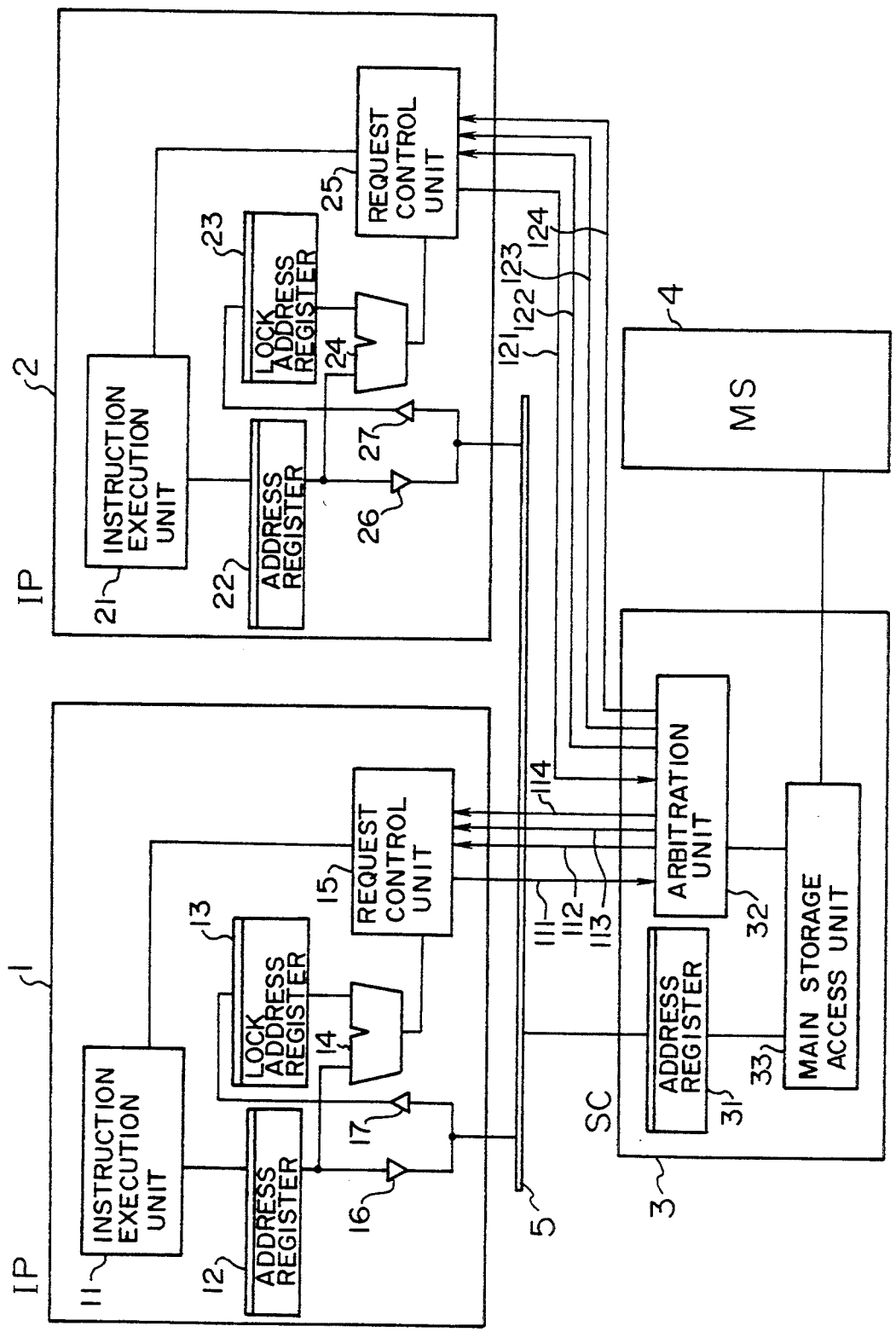
FIG. 1 is a block diagram showing the structure of a multi-processor system according to an embodiment of this invention.

FIG. 1 shows the arrangement of a multi-processor system according to the first embodiment of this invention.

Referring to FIG. 1, a processor (IP) 1, 2 is connected via a bus 5 to a storage controller (SC) 3 which is connected to a main storage (MS) 4.

Each IP 1, 2 has an instruction execution unit 11, 21. When the instruction execution unit 11, 21 issues a request, the request is sent to a request control unit 15, 25 and a request address is sent to an address register 12, 22. The request control unit 15, 25 is coupled to an arbitration unit 32 of SC 3 via a request signal line 111, 121, a bus acceptance signal line 112, 122, an acceptance signal line 113, 123, and a lock signal line 114, 124. The request control unit 15, 25 sends to SC 3 a request signal corresponding to the request made by the instruction execution unit 11, 21 via the request signal line 111, 121.

Each of request signal lines 111, 121 is constructed of a plurality of signal lines for allowing a plurality type of request signals to be issued.

Figures 2, 3:
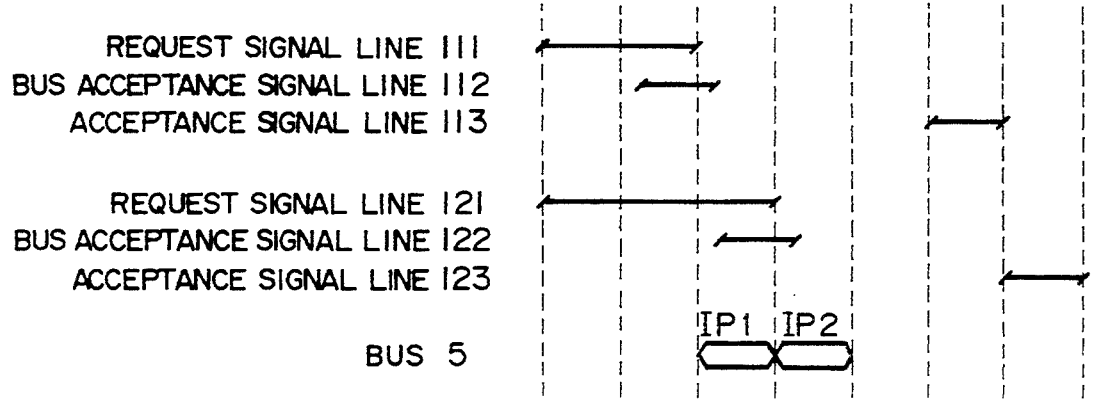
FIG. 2 is a list showing the types of request signals.
FIG. 3 is a timing chart showing the states of signal lines of a multi-processor system when requests conflict with each other.

FIG. 2 is a list showing the types of request signals according to this embodiment. As shown in FIG. 2, this embodiment provides six types of request signals including two types of fetch requests, two types of store requests, a fetch and lock setting request, and a store and lock release request.

Each IP 1, 2 is provided with a lock address register 13, 23 and a comparator 14, 24. The lock address register 13, 23 stores as a lock address a request address sent by another IP requesting a lock. The comparator 14, 24 compares the contents of the lock address register 13, 23 and the address register 12, 22, the comparison result being sent to the request control unit 15, 25.

The arbitration unit 32 of SC 3 receives a request signal from IP 1, 2 via the request signal line 111, 121, and sends back a bus use permission to the request control unit 15, 25 of IP 1, 2 via the bus acceptance signal line 112, 122. Receiving the bus use permission, IP 1, 2 sends the request address in the address register 12, 22 to the bus 5 via an amplifier 16, 26. Receiving the request address from the bus 5, SC 3 stores it in an address register 31.

A main storage access unit 33 accesses MS 4 in accordance with signals from the address register 31 and the arbitration unit 32. The operation of accessing MS 4 is not relevant to this invention, so the description thereof is omitted herein.

Upon completion of an access to MS 4, the arbitration unit 32 sends an acceptance to the request control unit 15, 25 via the acceptance signal line 113, 123. Then, a request made by the instruction execution unit 11, 21 with respect to MS 4 is completed.

Next, the operation will be described where requests conflict with each other.

FIG. 3 shows the state of signal lines when IP 1 and IP 2 of this system issue requests at the same time. In this embodiment, a request from an IP (IP 1) having a smaller ID number previously assigned has priority over another request.

Upon occurrence of concurrent requests by IP 1 and IP 2, the request signals of IP 1 and IP 2 are sent at the same time to the arbitration unit 32 of SC 3 via the request signal lines 111 and 121. The arbitration unit 32 responds to the request by IP 1 having a smaller ID number, and sends back a bus acceptance to IP 1 via the bus acceptance signal line 112. SC 3 suspends a response to IP 2 and does not send a bus acceptance back to IP 2 which remains unsettled after sending the request signal. After sending the bus acceptance to IP 1, the arbitration unit 32 then responds to the request by IP 2 and sends a bus acceptance back to IP 2 via the bus acceptance signal line 122. The request operation described above is therefore executed for IP 1 and IP 2 with a delay of one cycle therebetween.

Figure 4:
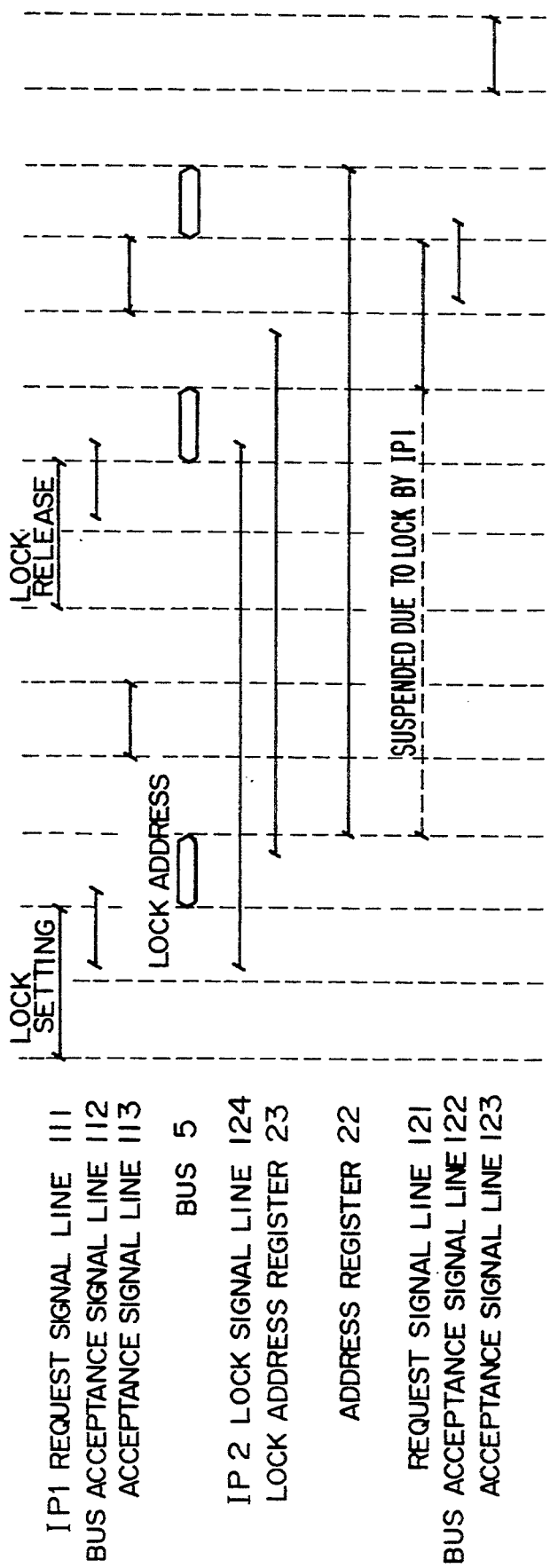
FIG. 4 is a timing chart showing the operation of lock setting.

The lock setting operation is illustrated in FIG. 4.

As shown in FIG. 4, for the lock setting operation by IP 1 for example, IP 1 sets the lock address in the address register 12 in the same manner as in the ordinary request operation, and the fetch and lock setting command is sent to the request signal line 111 from the request control unit 15.

In SC 3, not only the same operation as in the ordinary fetch request is executed, but also the arbitration unit 32 notifies IP 2 of a lock setting via the lock signal line 124 at the same time when it sends a bus acceptance to IP 1.

When IP 1 receives the bus acceptance signal from SC 3, it sends the lock address in the address register 12 to the bus 5 via the amplifier 16.

When IP 2 receives the lock setting notice from SC 3, it receives the lock address sent from IP 1 to the bus 5 and stores it in the lock address register 23.

The lock setting by IP 1 is thus completed.

Next, the description is directed to the case where a request is generated from the instruction execution unit 21 of IP 2 while IP 1 is locking.

If a request is an ordinary memory request such as a fetch request and a store request, the instruction execution unit 21 sends a request address to the address register 22, and the request to the request control unit 25.

The comparator 24 compares the addresses stored in the address register 22 and the lock address register 23. If the addresses are the same, i.e. are coincident, a coincidence signal is sent to the request control unit 25. When the coincidence signal is received, the request control unit 25 suspends sending a request signal to the request signal line 121. If the comparison result obtained by the comparator 24 indicates that the addresses are not coincident, the request control unit 25 sends a request signal to SC 3 via the request signal line 121 in the similar manner as the ordinary case.

The comparison by the comparator 24 is executed in the following manner depending upon the size of a unit lock area of a storage space. For example, if the unit lock area of a storage space is 256 bytes, the comparator 24 neglects the lower eight bits of the addresses, and compares the remaining address bits. If the unit lock area of a storage space is 512 bytes, the lower nine bits are neglected. Accordingly, the lock address register 23 may store only the lock address bits necessary for the comparison. This may also be applied to the second and third embodiments described later.

In the above manner, it becomes possible to lock a unit storage space belonging to a request address supplied from the IP.

The size of the unit lock area of a storage space may preferably be made to be variable using a manual switch or software.

If a request made by the instruction execution unit 21 is a lock setting request, the request control unit 25 suspends sending a request signal to the request signal line 121 until the lock signal line 124 is reset. Therefore, both IP 1 and IP 2 will not enter the lock setting state at the same time. A lock release request by IP 2 will not occur logically if IP 1 is in the lock setting state.

Next, the operation of releasing a lock setting state will be described.

If the instruction execution unit 11 of IP 1 intends to terminate a lock request, the request control unit 15 issues the store and lock release command to the request signal line 111.

When the store and lock release command is received from IP 1, the arbitration unit 32 of SC 3 resets the lock signal line 124 to thereafter notify IP 2 of a lock release.

In this case, if IP 2 has a request suspended during the lock state set by IP 1, the request control unit 25 of IP 2 sends the suspended request signal to SC 3 so that the request operation by IP 2 starts.

In the above manner, while IP 1 is locking a particular address, an access to this address by IP 2 is inhibited thereby ensuring the lock operation by IP 1.

The lock setting operation by IP 2 is executed in the same manner as described with IP 1. In this embodiment, two IPs have been used for the simplicity of description. It is apparent that three or more IPs may be used.

Figure 5:
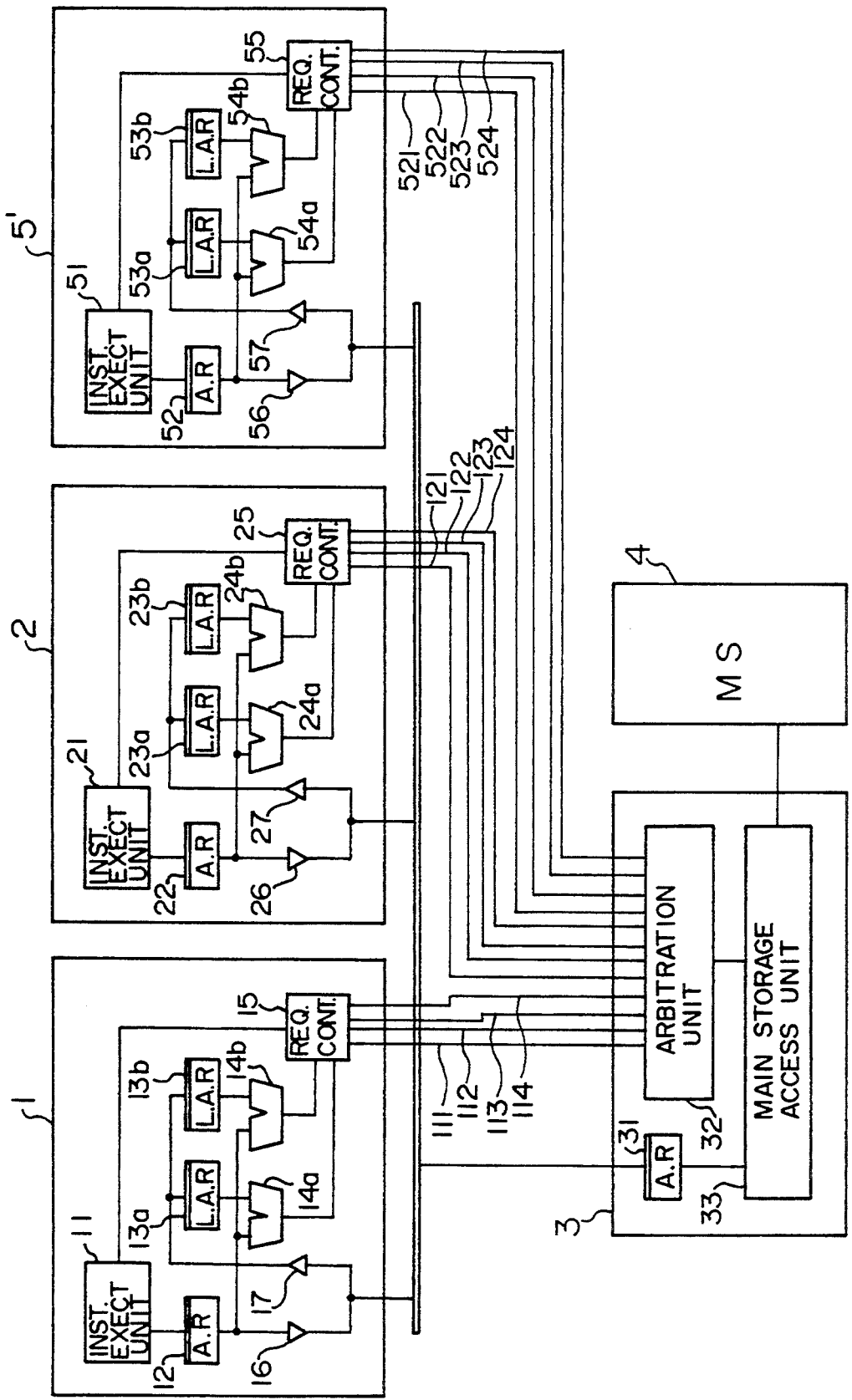
FIG. 5 is a block diagram showing the structure of a multi-processor system according to another embodiment of this invention.

FIG. 5 shows the arrangement of a multi-processor system according to another embodiment of this invention. In this embodiment, three IPs 1, 2 and 5' are used by way of example, and a plurality of lock addresses can be set.

Each IP has one instruction execution unit 11, 21, 51, one address register 12, 22, 52, two lock address registers 13a and 13b, 23a and 23b, 53a and 53b, two comparators 14a and 14b, 24a and 24b, 54a and 54b, and one request control unit 15, 25, 55.

The request control unit 15, 25, 55 of each IP is connected to an arbitration unit 32 of SC 3 via a request signal line 111, 121, 521, a bus acceptance signal line 112, 122, 522, an acceptance signal line 113, 123, 523, and a lock signal line 114, 124, 524.

In the multi-processor system shown in FIG. 5, if IP 1 issues a lock request, a lock setting is notified to the other IPs 2 and 5' from the arbitration unit 32 of SC 3 via the lock signal lines 124 and 524. In the same manner as in the first embodiment, IPs 2 and 5' receive the lock address sent by IP 1 to the bus 5 and store it in the address registers 23a and 53a.

Each IP stores a lock address in either of its two lock address registers.

Prior to sending a request signal from the execution unit 21 and 51 of IP 2, 5', the addresses in the address register and lock address register are compared with each other. If the addresses are coincident, the request signal is not sent but is suspended.

While IP 1 is locking a particular address and if IP 5' for example issues a lock request to a different address from that locked by IP 1, then the other IPs 1 and 2 store the lock address sent by IP 5' in an empty lock address register (e.g., the lock address register 13a for IP 1, and the lock address register 23b for IP 2).

A lock request to an address the same as the lock address stored in an IP (lock address sent from another IP) is suspended. A number of concurrent lock settings larger than the number of lock address registers of each IP is inhibited.

In the above case, IP 2 stores two lock addresses in two lock address registers. A request to an address the same as the addresses stored in the lock address registers 23a and 23b is suspended.

While IPs 1 and 5' are setting a lock and if IP 1 for example releases the-lock state, then the request control unit 15 of IP 1 issues a lock release request to SC 3.

When the lock release request is received from IP 1, SC 3 notifies IPs 2 and 5' of a lock release via the lock signal lines 124 and 524. In response to the lock release, IPs 2 and 5' initialize the corresponding lock address registers, or suspend the comparison between the contents of the lock address registers and the address registers until the next lock setting occurs.

A system having three or more IPs each having one lock address register is also possible. In this case, similar to the first embodiment, while one IP sets a lock, other IPs suspend a request to the lock address and a lock request.

A system having three IPs and capable of setting a plurality of lock addresses has been described. Next, the third embodiment of a multi-processor system according to the present invention will be described.

Figure 6:
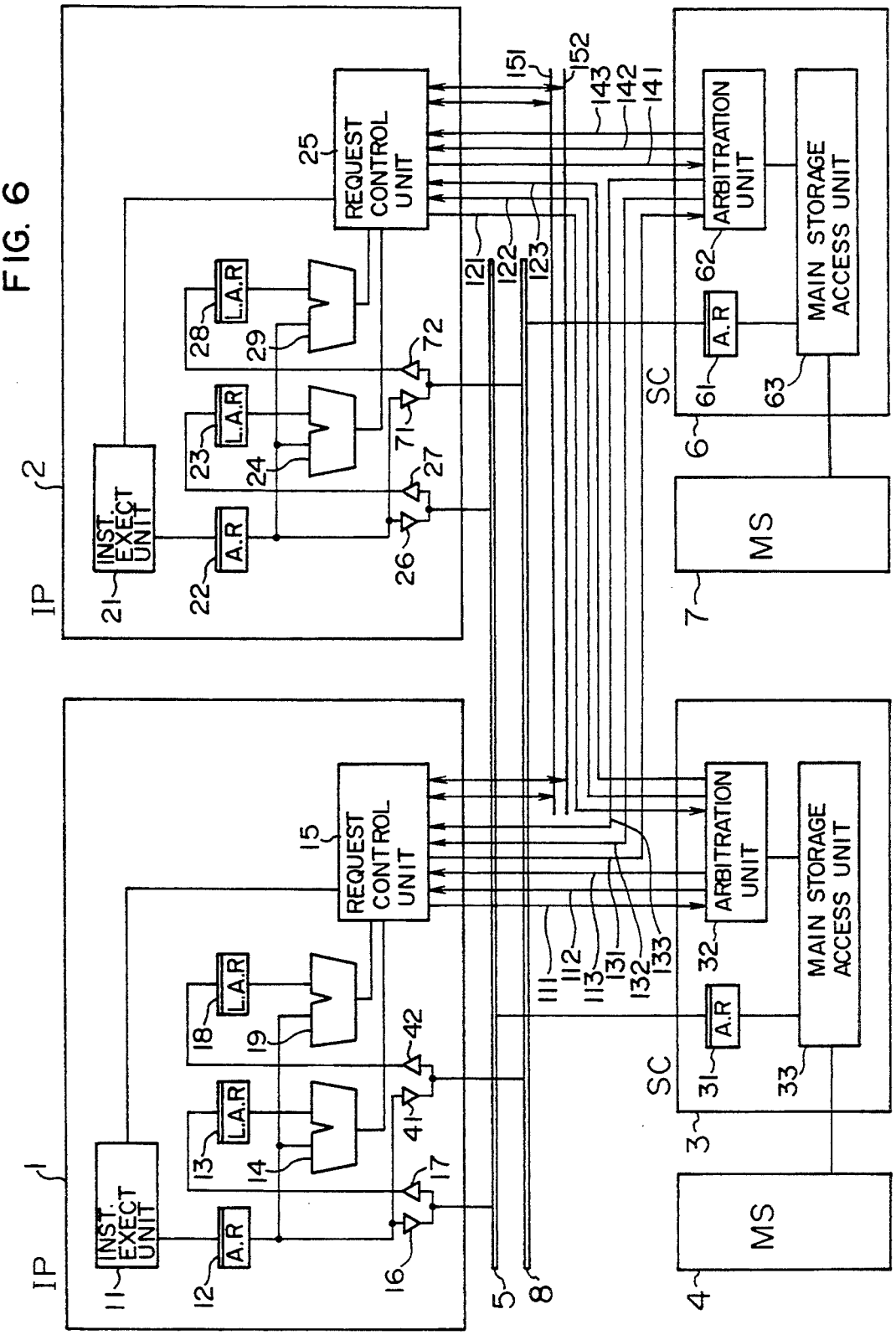
FIG. 6 is a block diagram showing the structure of a multi-processor system according to a third embodiment of this invention.

FIG. 6 shows the arrangement of a multi-processor system according to a still further embodiment of this invention.

As shown in FIG. 6, in this embodiment, IPs 1 and 2 are coupled to SC 3 via a bus 5, and to SC 6 via a bus 8, SC 3 being coupled to MS 4 and SC 6 to MS 7.

Each of IPs 1, 2 has an instruction execution unit 11, 21. Upon occurrence of a request to an MS, the instruction execution unit 11, 21 sends the request to the request control unit 15, 25, and a request address to the address register 12, 22. Each of the request control units 15 and 25 is coupled to the arbitration units 32 and 62 via the request signal lines 111 and 131, and 121 and 141, bus acceptance signal lines 112 and 132, and 122 and 142, and acceptance signal lines 113 and 133, and 123 and 143. A request signal is issued to SC 3 via the request signal lines 111 and 121, and to SC 6 via the request signal lines 121 and 141.

When IP 1, 2 issues a request signal to SC 3, the arbitration unit 32 returns back a bus use permission to the request control unit 15, 25 of IP 1, 2 via the bus acceptance signal line 112, 122.

When the bus use permission signal is received from SC 3, IP 1, 2 sends a request address in the address register 12, 22 to the bus 5 through the amplifier 16, 26. SC 3 then stores the request address in the address register 31.

On the other hand, when IP 1, 2 issues a request signal to SC 6, the arbitration unit 62 returns back a bus use permission to the request control unit 15, 25 of IP 1, 2 via the bus acceptance signal line 132, 142.

When the bus use permission signal is received from SC 6, IP 1, 2 sends a request address in the address register 12, 22 to the bus through the amplifier 41, 71. SC 6 then stores the request address in the address register 61.

Each IP 1, 2 also has lock address registers 13 and 18, 23 and 28 and comparators 14 and 19, 24 and 29, respectively, for SC 3, 6. The lock address register 13, 23 stores a lock address for SC 3, whereas the lock address register 18, 28 stores a lock address for SC 6. The comparators 14 and 19, 24 and 29 compare the contents of the lock address registers 13 and 18, 23 and 28 and the address register 12, 22, the comparison results being sent to the request control unit 15, 25.

The request control units 15 and 25 are coupled together by lock signal lines 151 and 152 to detect the lock state of each IP.

The lock signal line 151 is used for notifying a lock setting at SC 3, whereas the lock signal line 152 is used for notifying a lock setting at SC 6.

This embodiment is a system having SC 6 and bus 8 added to the system of the first embodiment. The fundamental operation is similar to the first embodiment, so only the different points will be described below.

When IP I issues a request signal to SC 3, IP 1 uses the request signal line 111. SC 3 uses the bus acceptance signal line 112 for notifying a bus use permission, and the acceptance signal line 113 for notifying a completion of an access to MS 4. Similarly, when IP 1 issues a request signal to SC 6, the request signal line 131 is used. SC 6 uses the bus acceptance signal line 132 for notifying a bus use permission, and the acceptance signal line 133 for notifying a completion of an access to MS 7.

If IP 1 sets a lock of a particular address of MS 7, IP 1 sends an ordinary fetch request to SC 6.

In this embodiment, since a lock request is notified directly between IPs, there are used only the request commands at items 1 to 4 in FIG. 2, i.e., only the fetch and store request commands.

When a bus acceptance signal is received from SC 6, IP 1 sends the lock address stored in the address register 22 to the bus 8. At the same time, a lock setting is notified to other IPs, IP 2 in this embodiment, via the lock signal line 152.

When the lock setting notice is received from IP 1, the request control unit 25 of IP 2 receives the lock address sent to the bus 8 by IP 1, and stores it in the lock address register 28.

Consider the case where IP 1 is locking MS 7 via SC 6 and a request is generated at the instruction execution unit 21 of IP 2. If the request made by IP 2 concerns SC 3, the request is allowed to be issued irrespective of the type of the request. On the other hand, if the request made by IP 2 concerns SC 6, the comparator 29 compares the request address set in the address register 22 with the lock address set in the lock address register 28. If the addresses are coincident, sending the request signal via the request signal line 141 to SC 6 by IP 2 is suspended until the lock state is released. If the addresses are not coincident, the request signal is sent in the same manner as in the ordinary case.

Lock control directly between IPs has been described for a multi-processor system having two IPs and a plurality of SCs and buses. A system having two or more IPs may also be realized by extending the arrangement of this embodiment.

Furthermore, in this embodiment, it has been described that the lock state can be notified directly between IPs without the operation of an SC. Such a notice may be applied also to the first embodiment by coupling together IPs with lock signal lines.

As can be appreciated from the foregoing description of the present invention, in a multi-processor system having a plurality of IPs and SCs connected via a bus or buses, a lock address can be exclusively controlled during a lock state on the side of a lock requesting IP. Such a lock control by the IP is realized using a small amount of hardware including one lock address register and a comparator. On the SC side, there is required a small amount of hardware for the lock control. Accordingly, the amount of hardware for the lock control of a system can be greatly reduced.

Furthermore, since the lock exclusive control is executed by the IP, the lock setting and lock exclusive control can be executed more speedily than if they are executed by the SC. Namely, the comparison of the lock address can be executed by the IP before the request signal is sent, so that the time from the request to the acceptance can be shortened as compared to when the comparison is executed by the SC, thereby improving the system performance.

I claim:

1. A processor connected to a common bus and sharing, under control of a central storage controller connected to the common bus, a main storage connected to the central storage controller with at least one other processor connected to the common bus, the central storage controller being common to all of the processors, each of the processors comprising:

an instruction execution unit for executing an instruction involving use of the main storage and issuing a request for use of the main storage and a request address associated with the request in response to the instruction executed by the instruction execution unit, wherein the request is one of a plurality of types of requests including a locking request for locking the main storage and a lock releasing request for releasing a lock of the main storage;

an address register for storing the request address issued by the instruction execution unit;

means for sending the request address stored in the address register to the common bus;

means for reading a request address from the common bus when the request address being read from the common bus was sent to the common bus by another one of the processors, the request address being associated with a locking request issued by the instruction execution unit of the other processor;

at least one lock address register, wherein each lock address register of the at least one lock address register is for storing as a lock address a request address read from the common bus by the reading means;

at least one comparator, wherein each comparator of the at least one comparator is for comparing the request address stored in the address register with the lock address stored in a respective lock address register of the at least one lock address register and outputting a comparison result indicating whether or not the request address is the same as the lock address; and a request control unit for receiving the request from the instruction execution unit and the comparison result from each comparator of the at least one comparator and sending a request signal indicative of the request to the central storage controller in response to the request;

wherein the request control unit sends the request signal to the central storage controller without delay if the comparison result indicates that the request address is not the same as the lock address;

wherein the request control unit suspends sending the request signal to the central storage controller if the comparison result indicates that the request address is the same as the lock address until after the instruction execution unit of the other processor issues a lock releasing request; and wherein the at least one lock address register is an arbitrary number of lock address registers, and wherein the instruction execution unit does not issue a locking request if all of the lock registers are storing a lock address.

2. A processor connected to a common bus and sharing, under control of a central storage controller connected to the common bus, a main storage connected to the central storage controller with at least one other processor connected to the common bus, the central storage controller being common to all of the processors, each of the processors comprising:

an instruction execution unit for executing an instruction involving use of the main storage and issuing a request for use of the main storage and a request address associated with the request in response to the instruction executed by the instruction execution unit, wherein the request is one of a plurality of types of requests including a locking request for locking the main storage and a lock releasing request for releasing a lock of the main storage;

an address register for storing the request address issued by the instruction execution unit;

means for sending the request address stored in the address register to the common bus;

means for reading a request address from the common bus when the request address being read from the common bus was sent to the common bus by another one of the processors, the request address being associated with a locking request issued by the instruction execution unit of the other processor;

at least one lock address register, wherein each lock address register of the at least one lock address register is for storing as a lock address a request address read from the common bus by the reading means;

at least one comparator, wherein each comparator of the at least one comparator is for comparing the request address stored in the address register with the lock address stored in a respective lock address register of the at least one lock address register and outputting a comparison result indicating whether or not the request address is the same as the lock address; and a request control unit for receiving the request from the instruction execution unit and the comparison result from each comparator of the at least one comparator and sending a request signal indicative of the request to the central storage controller in response to the request;

wherein the request control unit sends the request signal to the central storage controller without delay if the comparison result indicates that the request address is not the same as the lock address;

wherein the request control unit suspends sending the request signal to the central storage controller if the comparison result indicates that the request address is the same as the lock address until after the instruction execution unit of the other processor issues a lock releasing request; and wherein the at least one lock address register is only one lock address register, and wherein the instruction execution unit does not issue a locking request if the one address lock register is storing a lock address.

3. A multi-processor system comprising:
a plurality of processors;
a main storage shared by the processors; and
a storage controller connected to the main storage for controlling use of the main storage by the processors;

wherein each of the processors includes:
an instruction execution unit for issuing a request for using the main storage and a request address associated with the request in response to an instruction executed by the instruction execution unit, wherein the request is one of a plurality of types of requests including a locking request for locking the main storage;

an address register for storing the request address issued by the instruction execution unit;

means for sending the request address stored in the address register to each of the other processors when the request is the locking request;

at least one lock address register;

means for storing a request address sent by one of the other processors in one lock address register of the at least one lock address register as a lock address of the one of the other processors, wherein the lock address is associated with a locking request issued by the one of the other processors;

a comparator for comparing the request address stored in the address register with the lock address stored in the one lock address register and outputting a comparison result indicating whether or not the request address is the same as the lock address; and a request control unit for receiving the request from the instruction execution unit and the comparison result from the comparator, sending the request to the storage controller if the comparison result indicates that the request address is not the same as the lock address, and suspending sending the request to the storage controller if the comparison result indicates that the request address is the same as the lock address.

4. A multi-processor system according to claim 3, wherein the types of requests further include a lock releasing request for releasing locking of the main storage; and wherein each of the processors further includes:
means for sending a lock releasing request to each of the other processors, the lock releasing request having a request address associated therewith; and means for invalidating the lock address stored in the one lock address register in response to a lock releasing request sent by the one of the other processors, wherein the lock address which is invalidated is the same as the request address associated with the lock releasing request sent by the one of the other processors.

5. A multi-processor system comprising:

a common bus;

a plurality of signal lines including a request signal line, a bus acceptance signal line, and a lock signal line;

a plurality of processors connected to the common bus;

a main storage shared by the processors; and a storage controller connected to each of the processors via the plurality of signal lines, to the common bus, and to the main storage for controlling use of the main storage by the processors in response to requests for using the main storage received from the processors, wherein the requests include a plurality of types of requests including a locking request for locking the main storage;

wherein the storage controller includes:

means for receiving a request signal indicative of a request for using the main storage from each of the processors via the request signal line;

means for selecting one of the processors to be permitted to use the common bus based on the request signal received from each of the processors;

means for sending a bus acceptance signal indicative of permission to use the common bus to the selected processor via the bus acceptance signal line; and means for sending a lock signal indicating that a locking request has been issued by the selected processor to each of the processors except the selected processor via the lock signal line when the request signal received from the selected processor is indicative of a locking request issued by the selected processor; and wherein each of the processors includes:

an instruction execution unit for issuing a request for using the main storage and a request address associated with the request in response to an instruction executed by the instruction execution unit;

means for sending a request signal indicative of the request to the storage controller via the request signal line;

an address register for storing the request address issued by the instruction execution unit;

means for receiving the bus acceptance signal from the storage controller via the bus acceptance signal line;

means for sending the request address stored in the address register to the common bus in response to the bus acceptance signal received from the storage controller;

at least one lock address register;

means for receiving the lock signal from the storage controller via the lock signal line;

means for receiving a request address sent by the selected processor from the common bus in response to the lock signal received from the storage controller;

means for storing the request address received by the request address receiving means in one lock address register of the at least one lock address register as a lock address of the selected processor, wherein the lock address is associated with the locking request issued by the selected processor;

a comparator for comparing the request address stored in the address register with the lock address stored in the one lock address register and outputting a comparison result indicating whether or not the request address is the same as the lock address; and a request control unit for receiving the request from the instruction execution unit and the comparison result from the comparator, sending the request signal to the storage controller if the comparison result indicates that the request address is not the same as the lock address, and suspending sending the request signal to the storage controller if the comparison result indicates that the request address is the same as the lock address.

6. A multi-processor system according to claim 5, wherein the types of requests further include a lock releasing request for releasing locking of the main storage;

wherein the storage controller further includes:

means for receiving a request signal indicative of a lock releasing request from each of the processors via the request signal line, the lock releasing request having a request address associated therewith; and means for sending a lock reset signal indicating that a lock releasing request has been issued by the selected processor to each of the processors except the selected processor via the lock signal line when a request signal indicative of a lock releasing request is received from the selected processor; and wherein each of the processors further includes:

means for sending a request signal indicative of a lock releasing request to the storage controller via the request signal line;

means for receiving the lock reset signal from the storage controller via the lock signal line; and means for invalidating the lock address stored in the one lock address register in response to the lock reset signal received from the storage controller, wherein the lock address which is invalidated is the same as the request address associated with the lock releasing request issued by the selected processor.

7. A multi-processor system comprising:

a plurality of common buses;

a plurality of signal lines including a request signal line and a bus acceptance signal line;

a plurality of processors each connected to all of the common buses;

a plurality of main storages shared by the processors;

a plurality of storage controllers connected to each of the processors via the plurality of signal lines, to the common buses, and to the main storages such that each of the storage controllers is connected to a corresponding one of the common buses and to a corresponding one of the main storages, wherein the storage controllers are for controlling use of the main storages by the processors in response to requests for using the main storages received from the processors, wherein the requests include a plurality of types of requests including a locking request for locking one of the main storages; and a plurality of lock signal lines each connected to all of the processors, wherein each of the lock signal lines is connected to a corresponding one of the storage controllers;

wherein each of the storage controllers includes:

means for receiving a request signal indicative of a request for using the corresponding main storage from each of the processors via the request signal line;

means for selecting one of the processors to be permitted to use the corresponding common bus based on the request signal received from each of the processors;

means for sending a bus acceptance signal indicative of permission to use the corresponding common bus to the selected processor via the bus acceptance signal line; and means for sending a lock signal indicating that a locking request has been issued by the selected processor to each of the processors except the selected processor via the corresponding lock signal line when the request signal received from the selected processor is indicative of a locking request issued by the selected processor; and wherein each of the processors includes:

an instruction execution unit for issuing a request for using one main storage of the main storages and a request address associated with the request in response to an instruction executed by the instruction execution unit;

means for sending a request signal indicative of the request to the storage controller corresponding to the one main storage via the request signal line;

an address register for storing the request address issued by the instruction execution unit;

means for receiving the bus acceptance signal from each of the storage controllers via the bus acceptance signal line;

means for sending the request address stored in the address register to the common bus corresponding to the storage controller corresponding to the one main storage in response to a bus acceptance signal received from the storage controller corresponding to the one main storage;

a plurality of lock address registers each corresponding to a different one of the storage controllers;

means for receiving the lock signal from each of the storage controllers via the corresponding lock signal line;

means for receiving a request address sent by the selected processor from the common bus which the selected processor has been permitted to use in response to a lock signal received from the storage controller corresponding to the main storage for which the selected processor has issued a locking request;

means for storing the request address received by the request address receiving means in the lock address register corresponding to the storage controller corresponding to the main storage for which the selected processor has issued a locking request as a lock address of the selected processor, wherein the lock address is associated with the locking request issued by the selected processor;

a comparator for comparing the request address stored in the address register with a lock address stored in each of the lock address registers and outputting a comparison result indicating whether or not the request address is the same as the lock address stored in each of the lock address registers; and a request control unit for receiving the request from the instruction execution unit and the comparison result from the comparator, sending the request signal to the storage controller corresponding to the main storage for which the request was issued if the comparison result indicates that the request address is not the same as the lock address stored in the corresponding lock address register, and suspending sending the request signal to the storage controller corresponding to the main storage for which the request was issued if the comparison result indicates that the request address is the same as the lock address stored in the corresponding lock address register.

8. A multi-processor system according to claim 7, wherein the types of requests further include a lock releasing request for releasing locking of one of the main storages;

wherein each of the storage controllers further includes:

means for receiving a request signal indicative of a lock releasing request from each of the processors via the request signal line, the lock releasing request having a request address associated therewith; and means for sending a lock reset signal indicating that a lock releasing request has been issued by the selected processor to each of the processors except the selected processor via the corresponding lock signal line when a request signal indication of a lock releasing request is received from the selected processor; and wherein each of the processors further includes:

means for sending a request signal indicative of a lock releasing request to the storage controller corresponding to the main storage for which the lock releasing request has been issued via the request signal line;

means for receiving the lock reset signal from each of the storage controllers via the corresponding lock signal line; and means for invalidating the lock address stored in the lock address register corresponding to the storage controller corresponding to the main storage for which the selected processor has issued a locking request in response to the lock reset signal received from the storage controller corresponding to the main storage for which the selected processor has issued a locking request, wherein the lock address which is invalidated is the same as the request address associated with the lock releasing request issued by the selected processor.

* * * * *